Figure 1:
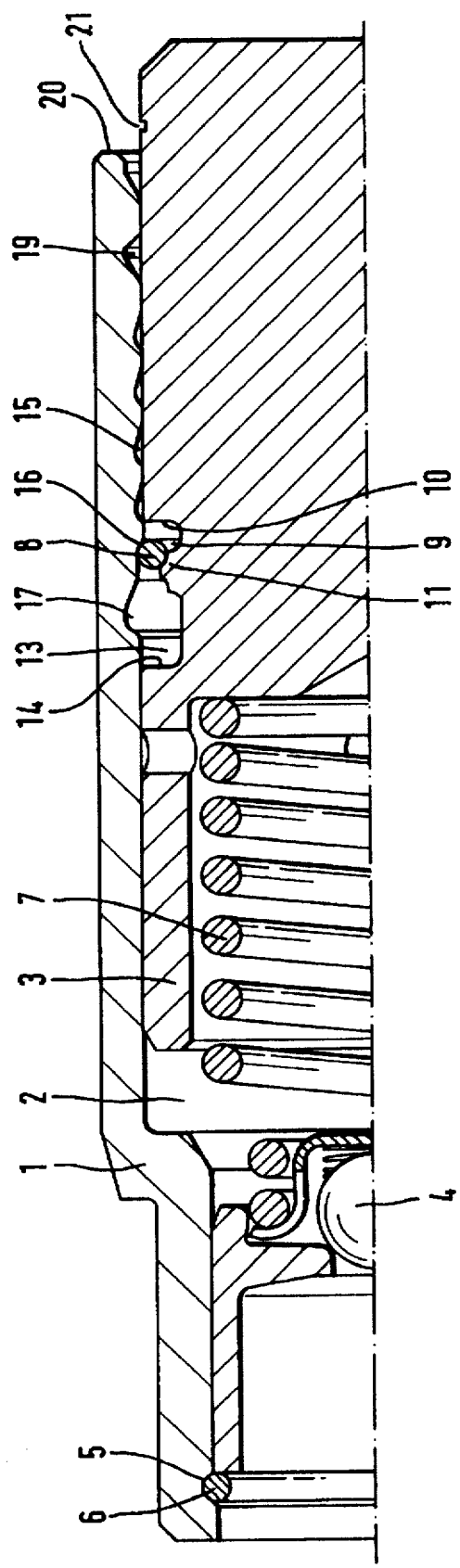

United States Patent [19]

Stief

[11] Patent Number: 5,704,860

[45] Date of Patent: Jan. 6, 1998

[54] TRANSPORT LOCKING SYSTEM FOR A CHAIN TENSIONER

[75] Inventor: Hermann Stief, Furth, Germany

[73] Assignee: INA Walzlager Schaeffler KG, Germany

[21] Appl. No.: 722,265

[22] PCT Filed: Mar. 24, 1995

[86] PCT No.: PCT/EP95/01108

§ 371 Date: Oct. 7, 1996

§ 102(e) Date: Oct. 7, 1996

[87] PCT Pub. No.: WO95/30845

PCT Pub. Date: Nov. 16, 1995

[30] Foreign Application Priority Data

May 6, 1994 [DE] Germany ............... 44 15 960.9

[51] Int. Cl.[6] ............................................. F16H 7/08
[52] U.S. Cl. ................................... 474/110; 474/138
[58] Field of Search ............................ 474/101, 110, 474/138, 135

[56] References Cited

U.S. PATENT DOCUMENTS

| 4,772,251 | 9/1988 | Goppelt et al. | 474/138 X |
| 4,790,801 | 12/1988 | Schmidt et al. | 474/110 |
| 4,792,322 | 12/1988 | Goppelt et al. | 474/138 X |
| 4,902,268 | 2/1990 | Hertrich et al. | 474/135 |
| 4,969,858 | 11/1990 | Hertrich et al. | 474/135 |

FOREIGN PATENT DOCUMENTS

| 0265727 | 5/1988 | European Pat. Off. |
| 0266565 | 5/1988 | European Pat. Off. |
| 1650620 | 1/1970 | Germany |

*Primary Examiner*—Roger J. Schoeppel
*Attorney, Agent, or Firm*—Bierman, Muserlian and Licas LLP

[57] ABSTRACT

The proposed chain tightener is provided with a damping piston (3) in a guide bore (2). A stop ring (8) is provided between the damping piston (3) and the housing (1). The stop ring (8) cooperates with grooves (9, 17, 13) and stops (11, 10, 14) on the housing (1) and on the damping piston (3), preventing the damping piston (3) from sliding too far into the housing (1). To allow the damping piston (3) to be locked in position in the bore (2), it is proposed that the stop ring (8) should be clamped in a locking position between two contact surfaces (12, 16) on the housing (1) and damping piston (3) respectively, the contact surfaces (12, 16) being inclined in relation to the axis of the damping piston.

6 Claims, 4 Drawing Sheets

TRANSPORT LOCKING SYSTEM FOR A CHAIN TENSIONER

DESCRIPTION

The present invention concerns a chain tensioner comprising:
- a damping piston guided in a housing and axially biased in chain tensioning direction by a spring means;
- a radially resilient stop ring arranged between the damping piston and the housing, there being provided for the stop ring respectively on the housing and the damping piston, a reception groove and an entraining groove having an entraining edge which, when the damping piston is pushed into the housing, entrains the stop ring till the stop ring snaps into the reception groove; and
- a stop groove defined on the damping piston between a stop edge and a stop ramp, so that the stop ramp can pass below the stop ring when the stop ring is snapped into the reception groove, the stop edge pushes the stop ring out of the reception groove into a locking groove of the housing under the force of the spring means, and, at an end of a return stroke, the stop ring situated in the locking groove abuts against the stop ramp.

A chain tensioner of this type is known, for example, from EP-A 02 66 565. For assembling this chain tensioner, the stop ring is pushed by the entraining edge into the housing where it spreads radially resiliently in the reception groove. Under the action of the force of the spring means the stop ramp of the damping piston is then pushed below the stop ring, following which the stop ring is pushed by the stop edge of the stop groove into the locking groove. This position corresponds to the starting position of the chain tensioning range. A loosening of the chain is compensated by the damping piston being pushed further out of the housing so that the stop ring is displaced and locked into the next locking groove, if necessary. A return stroke of the damping piston is limited by an abutment of the stop ramp against the stop ring so that the damping piston cannot recede further into the housing. The locking position provided in this chain tensioner is such that it prevents the piston from being pushed out of the housing under the force of the spring means: A mounting ring is snapped into a groove of the damping piston having an inclined surface which merges with a locking surface. By using a tool which can be inserted into a gap between the housing and the damping piston, the mounting ring can be pushed over an inclined surface onto the locking surface. It then engages into a groove of the housing and thus blocks a movement of the piston out of the housing. In the blocked position, the chain tensioner is easy to mount. But if the damping piston is to load the chain in an operational position, the piston has to be pushed manually against the force of the spring means so that the mounting ring snaps back from the locking surface into the groove. The blocking position is thus neutralized so that the stop ring is pushed into the first locking groove by the force of the spring means. Following this, the mounting ring remains on the damping piston.

It is an object of the invention to improve a chain tensioner of the generic type so that the blocking position can continue to be used for easier mounting but a mounting ring is no longer required.

The invention achieves this object by the fact that the stop ramp comprises a contact surface facing the entraining groove and inclined relative to the axis of the damping piston, and the housing comprises a contact surface starting from the reception groove and inclined relative to the axis of the damping piston, wherein, in a blocking position, the stop ring is clamped under the force of the spring means between said contact surfaces which are situated opposite each other.

The function of the mounting ring of the prior art is performed in the chain tensioner of the invention by the stop ring. For assembling the chain tensioner, the damping piston is pushed into the housing only so far that the stop ring comes to bear against the contact surface on the housing. If the damping piston is then pushed outwards by the force of the spring means, the contact surface of the stop ramp comes to bear against the stop ring and thus blocks a further outward movement of the damping piston. This blocking action is neutralized by the piston being pushed again inwards whereby the entraining edge entrains the stop ring till this snaps into the reception groove. When the damping piston is pushed anew outwards by the force of the spring means, the stop edge comes to bear against the stop ring. A further outward displacement of the damping piston causes the stop ring to be pushed out of the reception groove, past the contact surface on the housing, till the operational position of the piston has been reached.

In an advantageous embodiment according to claim 2, the reception groove comprises a cylindrical portion which merges directly with the contact surface configured as a cone. During assembly of the chain tensioner, the blocking position is obtained as described above but care must be taken that the damping piston is not pushed in too far because there would then be the danger of the stop ring snapping into the reception groove. If this happens, the blocking position cannot be established. However, this risk is reduced by the provision of the cylindrical portion because, on a further inward movement of the damping piston, the stop ring is at first pushed along the cylindrical portion. Within this range, the blocking position can be reached without any problem by an outward displacement of the damping piston because the contact surface provided on stop ramp comes to bear against the stop ring and pushes it forwards till the stop ring comes to bear against the contact surface of the housing.

According to claim 3, the contact surface on the stop ramp is advantageously made as a groove with a convex profile. This configuration is particularly suited to a stop ring having a circular cross-sectional profile.

In an advantageous embodiment according to claim 4, all the locking grooves are arranged between the reception groove and a reversing groove provided on the housing, the stop ramp being able to pass below the stop ring when this is snapped into the reversing groove. When the damping piston is pushed outwards by the force of the spring means, the stop edge pushes the stop ring forwards till this snaps into the reversing groove. In this position, the stop ring bears against the stop edge and the piston cannot be moved outwards readily. This is only possible if a force greater than the force of the spring means is applied to the damping piston. In this case, the stop edge displaces the stop ring out of the reversing groove and the damping piston can be removed from the housing. If this greater force is not applied but rather, the damping piston is to be returned to its blocking position, the piston is simply pushed inwards whereby the stop ramp at first moves inwards below the stop ring till the entraining edge pushes the stop ring forwards as described above.

It has already been mentioned that the damping piston should not be moved too far into the housing during assembly of the chain tensioner. It is therefore appropriate in this connection, as stated in claim 5, to provide marks on the housing and on the damping piston so that a relative axial position of the two marks indicates that the stop ring is bearing against the contact surface of the housing. According to claim 6, the mark on the housing can be constituted by an end face thereof and the mark on the damping piston, by a recess provided on a peripheral surface of the piston.

It is to be understood that the invention also covers embodiments obtained by a simple kinematic reversal: In such a case, the reception groove, the contact surface provided on the housing and the locking grooves would not be arranged on the housing but on the damping piston; the stop edge, the stop groove, the stop ramp with its contact surface and the entraining groove with the entraining edge would not be arranged on the damping piston but on the housing. The stop ring would then be biased radially inwards.

Figure 2:
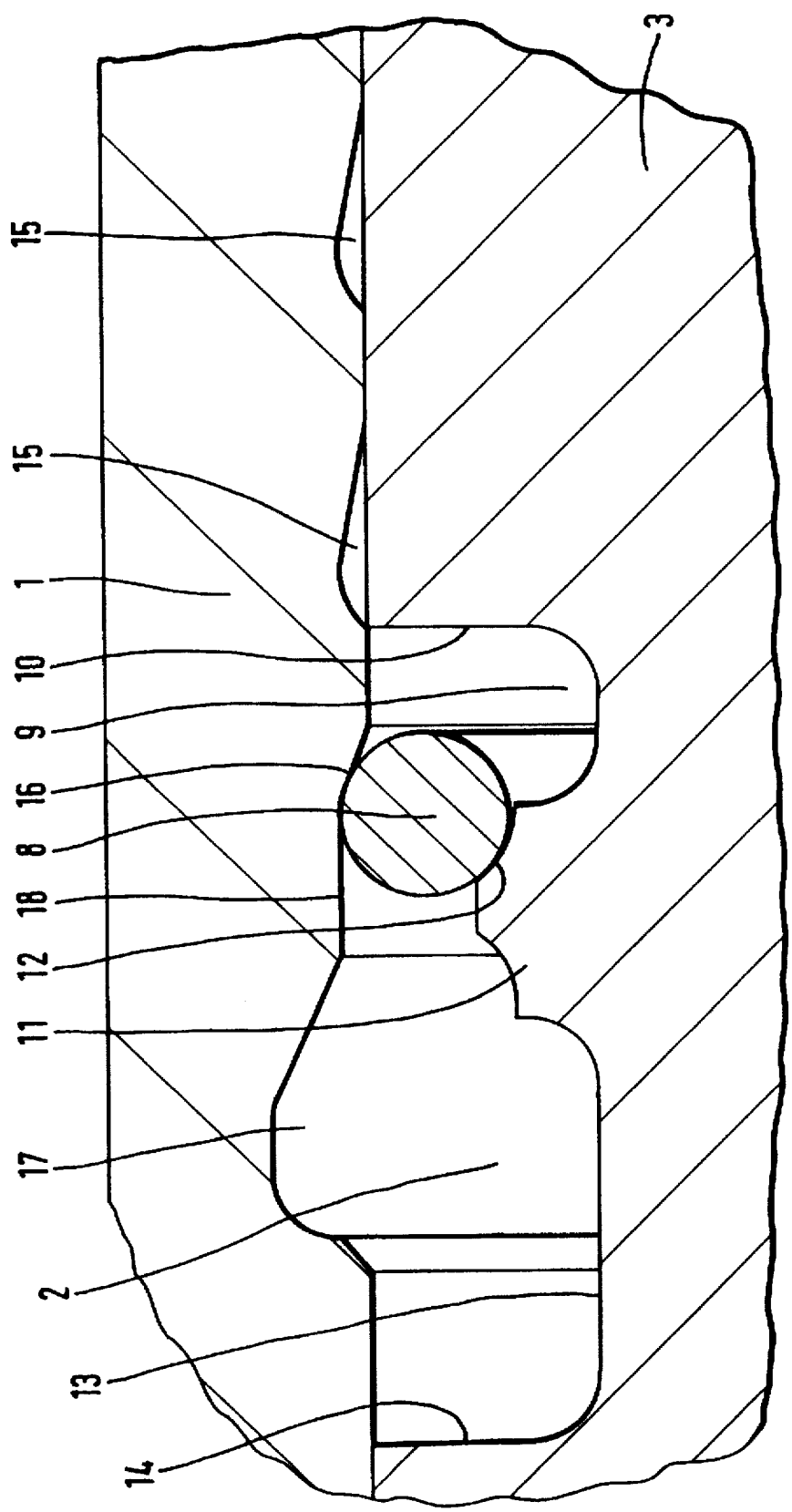
Figure 3:
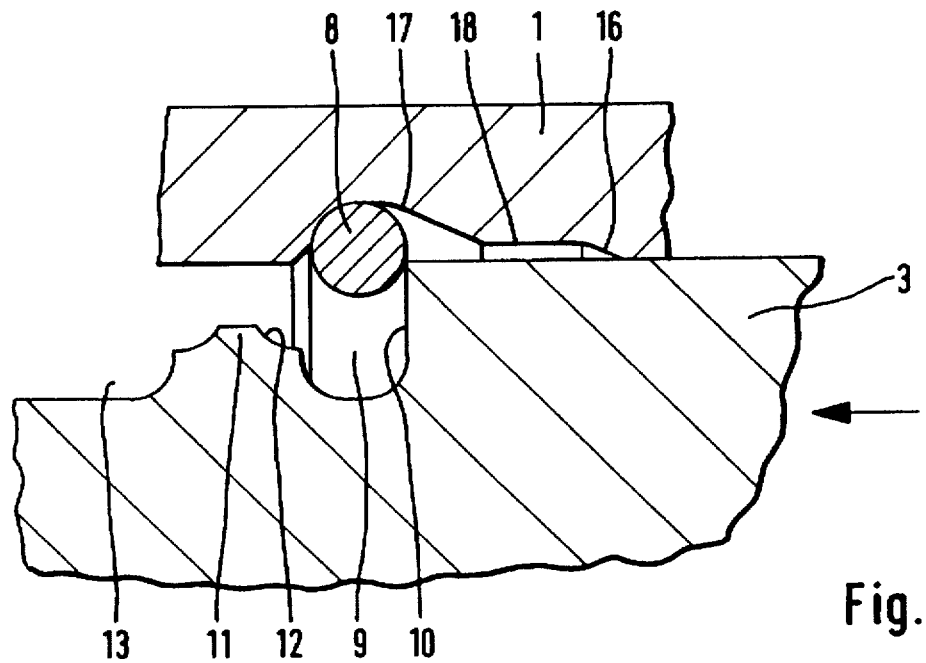
Figure 4:
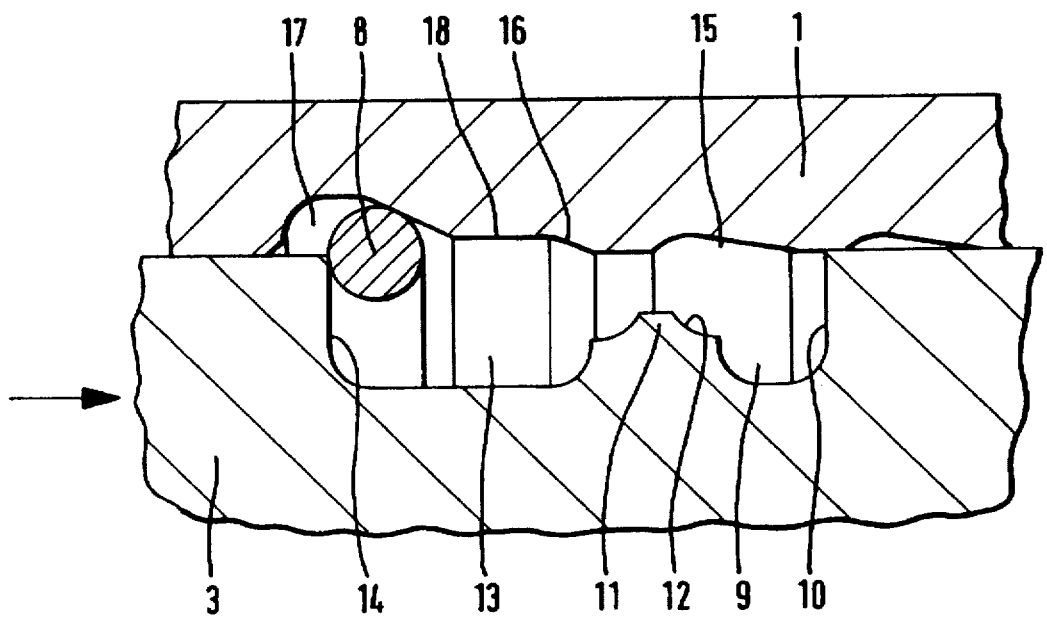
Figure 5:
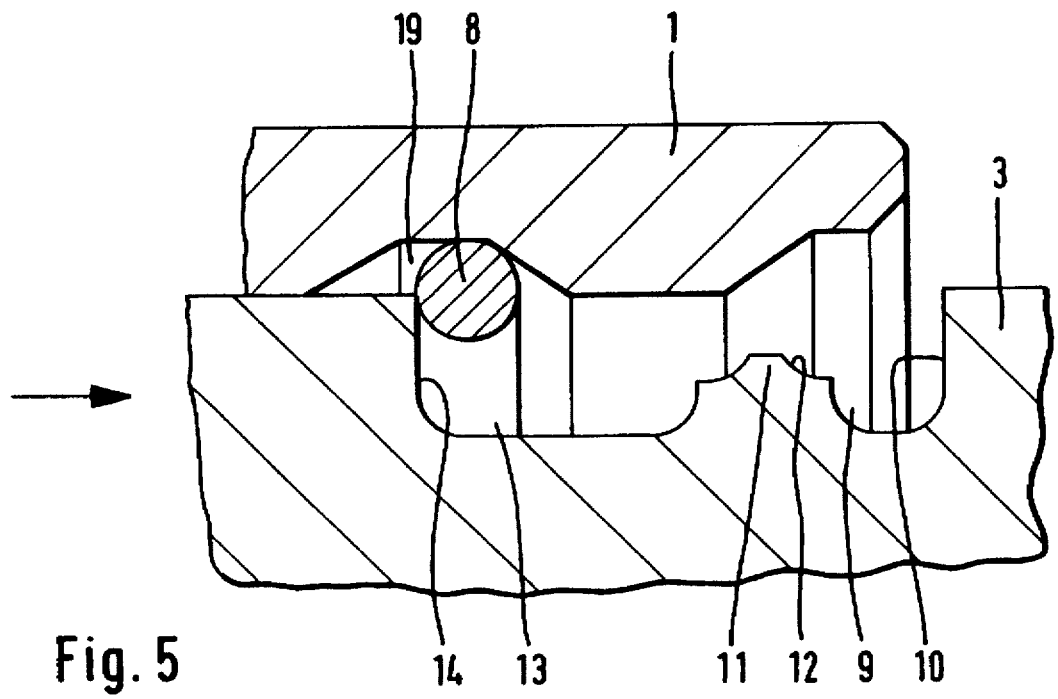
Figure 6:
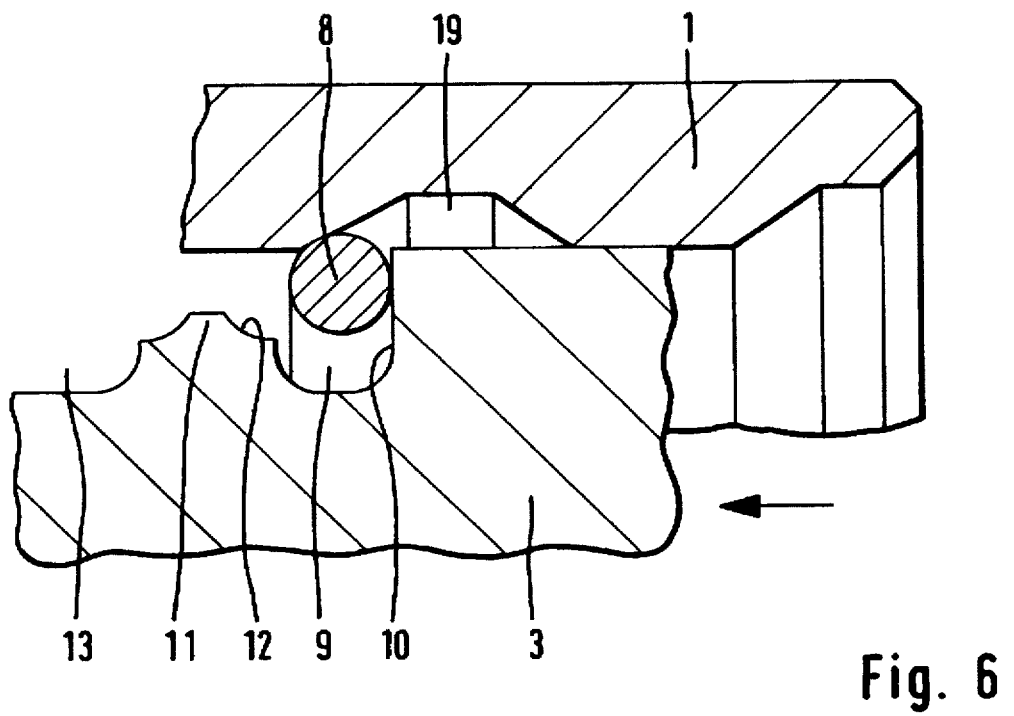

The invention will now be described more closely with the help of an example of embodiment represented in six figures which show:

FIG. 1, a longitudinal cross-section through a chain tensioner of the invention;

FIG. 2, an enlarged detail showing the blocking position of the damping piston;

FIG. 3, substantially the same detail as in FIG. 2, but with the damping piston displaced further inwards;

FIG. 4, a detail as in FIG. 3, but with the piston moved further outwards from the position of FIG. 3;

FIG. 5, an enlarged detail of the chain tensioner of FIG. 1 showing the region of the reversing groove, the damping piston being situated further outwards than in FIG. 1;

FIG. 6, a detail of FIG. 5, but with the damping piston pushed further inwards than in FIG. 5.

A one-piece housing 1 comprises a guide bore 2 which is open at one end and into which a damping piston 3 is inserted. At one end of the housing 2, there is arranged a non-return valve 4 which is supported axially by a securing ring 6 snapped into a groove 5 of the housing 1. Between the non-return valve 4 and the damping piston 3 is disposed a compression coil spring 7 which loads the damping piston 3 in axial direction tending to push the damping piston 3 out of the housing bore 2 towards a chain, not shown. A stop ring 8 is arranged between the damping piston 3 and the housing 1 and, in the view shown in FIG. 1, this stop ring 8 retains the damping piston 3 in a blocking position so that the damping piston 3 cannot be pushed further outwards by the force of the compression coil spring 7.

The blocking position which will now be discussed can be clearly seen in the enlarged detail shown in FIG. 2. The damping piston 3 comprises an entraining groove 9 which is defined between an entraining edge 10 and a stop ramp 11. The end of the stop ramp 11 facing the entraining groove 9 comprises a spherical groove 12. The end of the stop ramp 11 remote from the entraining groove 9 merges into a stop groove 13 which, at its end away from the stop ramp 11, is delimited by a stop edge 14. Axially adjacent to one another on the inner peripheral surface of the housing, there are arranged a number of locking grooves 15 next to which a cone 16 is formed on the inner peripheral surface of the housing 1. The peripheral surface of the cone 16 faces the compression coil spring 7. The cone 16 merges into a reception groove 17 which starts with a cylindrical portion 18 and is then conically widened. It can be seen in the figure that the radially resilient stop ring 8 is clamped under the force of the compression coil spring 7 between the cone 16 and the spherical groove 12 so that the damping piston 3 cannot be displaced further outwards.

If the damping piston 3 is pushed from this position against the compression coil spring 7, the entraining edge 10 comes to bear against the stop ring 8 as represented in FIG. 3. The arrow in this figure indicates that the damping piston 3 is displaced towards the compression coil spring 7. In the representation of this figure, the stop ring 8 has been entrained so far that it widens radially to snap into the reception groove 17, and the entraining edge 10 still bears against the stop ring 8. In this state, it is not possible for the damping piston 3 to be displaced further inwards. However, if the previously exerted force used to push the damping piston 3 towards the compression coil spring 7 is released, a reversal of movement of the damping piston 3 is caused by the force of the spring 7 as indicated by the arrow in FIG. 4. In the position shown in this figure, the stop edge 14 has come to bear against the stop ring 8. Comparing FIGS. 3 and 4 it can be seen that the stop ramp 11 has passed below the stop ring 8 because the stop ring 8 has widened to such an extent in the reception groove 17 that the inner diameter of the stop ring 8 is larger than the outer diameter of the stop ramp 11. The force of the compression coil spring 7 can now push the damping piston 3 further outwards, the stop edge 14 pushing the stop ring 8 forwards till the position of operational readiness of the chain tensioner is reached, intermediate positions not being shown in the figure. Operational readiness is established when the stop ring has snapped into a locking groove 15 or even when it is in a position outside of a locking groove 15, for example between two locking grooves 15. The depth of the stop groove 13 is such that the stop ring 8 can enter it without obstruction when pushed radially inwards. The radially innermost position of the stop ring 8 is reached when it bears against the wall of the guide bore 2.

If the force of the compression coil spring 7 is not opposed by any outer force, which is the case, for example, when the chain is removed, the damping piston 3 is moved further outwards till it reaches an instable holding position as shown in FIG. 5. Under the action of the compression coil spring 7, the stop edge 14 has pushed the stop ring 8 so far that the stop ring 8 snaps into a reversing groove 19, the stop edge 14 still bearing against the stop ring 8. The force of the compression coil spring 7 cannot push the damping piston 3 any further outwards. This can only be done by the action of a larger force on the damping piston 3. The reversing groove 19 is configured so that this larger force can move the stop ring 8 out of the reversing groove 19 thus permitting the damping piston 3 to be finally removed from the housing bore 2.

If, instead of applying this larger force, the damping piston 3 is again pushed inwards, the entraining edge 10 comes to bear against the stop ring 8 after the stop ramp has passed below the stop ring 8, the stop ring 8 being thereby pressed out of the reversing groove 19. The damping piston 3 can now be pushed inwards till it re-gains its blocking position as described above. The depth of the entraining groove 9 is such that the stop ring 8 can enter it without obstruction when pressed radially inwards. The radially innermost position of the stop ring 8 is reached when it bears against the wall of the guide bore 2.

It is appropriate in some cases to have marks to show whether the damping piston has been pushed inwards sufficiently so as to be able to take its blocking position when the outer force is released. One possible type of marks are shown in FIG. 1. A mark 20 on the housing 1 is formed by the end face of the housing 1. A mark 21 on the damping piston 3 is constituted by a peripheral groove. In this example, the two marks 20, 21 are situated in a common transverse plane with one another when the stop edge 10 is situated in a common transverse plane with the starting-point of the cone 16. It is then guaranteed that the stop ring 8 is clamped between the cone 16 and the spherical groove 12.

| List of reference numbers | |
|---|---|
| 1 Housing | 11 Stop ramp |
| 2 Guide bore | 12 Spherical groove |
| 3 Damping piston | 13 Stop groove |
| 4 Non-return valve | 14 Stop edge |
| 5 Groove | 15 Locking groove |
| 6 Securing ring | 16 Cone |
| 7 Compression coil spring | 17 Reception groove |
| 8 Stop ring | 18 Cylindrical portion |
| 9 Entraining groove | 19 Reversing groove |
| 10 Entraining edge | 20 Mark |
| | 21 Mark |

I claim:

1. A chain tensioner comprising:

a damping piston (3) guided in a housing (1) and axially biased in chain tensioning direction by a spring means (7);

a radially resilient stop ring (8) arranged between the damping piston (3) and the housing (1), there being provided for the stop ring (8) respectively on the housing (1) and the damping piston (3), a reception groove (17) and an entraining groove (9) having an entraining edge (10) which, when the damping piston (3) is pushed into the housing (1), entrains the stop ring (8) till the stop ring (8) snaps into the reception groove (17); and a stop groove (13) defined on the damping piston (3) between a stop edge (14) and a stop ramp (11), so that the stop ramp (11) can pass below the stop ring (8) when the stop ring (8) is snapped into the reception groove (17), the stop edge (14) pushes the stop ring (8) out of the reception groove (17) into a locking groove (15) of the housing (1) under the force of the spring means (7), and, at an end of a return stroke, the stop ring (8) situated in the locking groove (15) abuts against the stop ramp (11), characterized in that, the stop ramp (11) comprises a first contact surface (12) facing the entraining groove (9) and inclined relative to an axis of the damping piston (3), and the housing (1) comprises a second contact surface (16) starting from the reception groove (17) and inclined relative to the axis of the damping piston (3), wherein, in a blocking position, the stop ring (8) is clamped under the force of the spring means (7) between said contact surfaces (12, 16) which are situated opposite each other.

2. A chain tensioner of claim 1 wherein the reception groove (17) comprises a cylindrical portion (18) which merges directly with the second contact surface (16) configured as a cone (16).

3. A chain tensioner of claim 1 wherein the first contact surface (12) on the stop ramp (11) is made as groove (12) with a convex profile.

4. A chain tensioner of claim 1 wherein each locking groove (15) is arranged between the reception groove (17) and a reversing groove (19) provided on the housing (1), the stop ramp (11) being able to pass below the stop ring (8) when said stop ring (8) is snapped into the reversing groove (19).

5. A chain tensioner of claim 1 wherein marks (20, 21) are provided on the housing (1) and on the damping piston (3) so that a relative axial position of said marks (20, 21) indicates that the stop ring (8) is bearing against the second contact surface (16) of the housing (1).

6. A chain tensioner of claim 5 wherein the marks (20, 21) are an end face (20) of the housing (1) and a recess (21) provided on the damping piston (3).

* * * * *